United States Patent
Sammon et al.

(10) Patent No.: US 11,980,321 B2
(45) Date of Patent: May 14, 2024

(54) COOKING APPLIANCE WITH COOKED FOOD HOLDING APPARATUS

(71) Applicant: Marmon Foodservice Technologies, Inc., Osseo, MN (US)

(72) Inventors: Jonathan Sammon, Oak Park, IL (US); Benjamin Slotarski, Palatine, IL (US); Christian Braun, Lake Forest, IL (US); Leonard Zelek, Chicago, IL (US); Steven Shei, Fort Wayne, IN (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 535 days.

(21) Appl. No.: 17/083,520

(22) Filed: Oct. 29, 2020

(65) Prior Publication Data

US 2021/0127898 A1    May 6, 2021

Related U.S. Application Data (60) Provisional application No. 62/930,882, filed on Nov. 5, 2019, provisional application No. 62/928,616, filed on Oct. 31, 2019.

(51) Int. Cl.
*A47J 37/04* (2006.01)
*A47J 36/24* (2006.01)
(Continued)

(52) U.S. Cl.
CPC .......... *A47J 37/045* (2013.01); *A47J 36/24* (2013.01); *A47J 36/32* (2013.01); *A47J 36/36* (2013.01)

(58) Field of Classification Search
CPC .......... A47J 37/045; A47J 36/24; A47J 36/32; A47J 36/36
See application file for complete search history.

(56) References Cited

U.S. PATENT DOCUMENTS 3,596,591 A * 8/1971 Spates ............... A47J 37/06
126/41 R
4,151,791 A * 5/1979 Baker ............... A47J 37/044
99/401

(Continued)

FOREIGN PATENT DOCUMENTS

EP          2384135      8/2013
WO       2020091840     5/2020

OTHER PUBLICATIONS

Extended European Search Report for European Patent Application No. 20205055.5, dated Mar. 15, 2021.

(Continued)

*Primary Examiner* — Nathaniel E Wiehe
*Assistant Examiner* — Keith Brian Assante
(74) *Attorney, Agent, or Firm* — Andrus Intellectual Property Law, LLP (57) ABSTRACT

A heat transfer system for cooking a food product is provided. The heat transfer system includes an enclosure, heat sources within the enclosure operate to output heat for a cooking process, at least one conveyor positioned relative to the cooking heat elements, and a warming assembly. The warming assembly is configured to receive at least one pan configured to store cooked food product. The warming assembly defines an controlled environment about the at least one pan. A blocking element defines an opening through the enclosure into the controlled environment of the warming assembly.

21 Claims, 8 Drawing Sheets

(51) Int. Cl.
*A47J 36/32* (2006.01)
*A47J 36/36* (2006.01)

(56) References Cited

U.S. PATENT DOCUMENTS

| | | | |
|---|---|---|---|
| 4,254,697 A | 3/1981 | Lang-Ree et al. | |
| 4,345,514 A * | 8/1982 | Morley | A47J 37/046 |
| | | | 99/425 |
| 4,389,562 A | 6/1983 | Chaudoir | |
| 4,881,519 A | 11/1989 | Henke | |
| 4,951,648 A | 8/1990 | Shukla et al. | |
| 5,179,265 A | 1/1993 | Sheridan et al. | |
| 5,253,564 A * | 10/1993 | Rosenbrock | A21B 1/48 |
| | | | 99/335 |
| 5,588,354 A | 12/1996 | Stuck et al. | |
| 5,724,886 A | 3/1998 | Ewald et al. | |
| 5,832,814 A * | 11/1998 | Nakatani | A47J 37/044 |
| | | | 99/450.6 |
| 5,947,012 A | 9/1999 | Ewald et al. | |
| 6,035,765 A | 3/2000 | Finck | |
| 6,119,587 A | 9/2000 | Ewald et al. | |
| 6,175,099 B1 | 1/2001 | Shei et al. | |
| 6,209,447 B1 | 4/2001 | Ewald et al. | |
| 6,262,394 B1 | 7/2001 | Shei et al. | |
| 6,358,548 B1 | 3/2002 | Ewald et al. | |
| 6,414,274 B1 * | 7/2002 | Mahyari | A47J 37/103 |
| | | | 219/442 |
| 6,541,739 B2 | 4/2003 | Shei et al. | |
| 6,595,117 B1 | 7/2003 | Jones et al. | |
| 6,607,766 B2 | 8/2003 | Ewald et al. | |
| 6,624,396 B2 | 9/2003 | Witt et al. | |
| 6,786,422 B1 | 9/2004 | Wortman et al. | |
| 6,817,283 B2 | 11/2004 | Jones et al. | |
| 7,038,172 B1 | 5/2006 | Stuck | |
| 7,091,452 B2 | 8/2006 | Kingdon et al. | |
| 7,105,779 B2 | 9/2006 | Shei | |
| 7,227,102 B2 | 6/2007 | Shei | |
| 7,232,062 B1 | 6/2007 | Salerno | |
| 7,297,903 B1 | 11/2007 | March et al. | |
| 7,303,776 B2 | 12/2007 | Sus et al. | |
| 7,328,654 B2 | 2/2008 | Shei | |
| 7,340,992 B1 | 3/2008 | Wolfe et al. | |
| RE40,290 E | 5/2008 | Shei et al. | |
| 7,385,160 B2 | 6/2008 | Jones | |
| D579,710 S | 11/2008 | Wilson et al. | |
| 7,726,967 B2 | 6/2010 | Best | |
| 7,765,918 B2 | 8/2010 | Garniss et al. | |
| 7,800,023 B2 | 9/2010 | Burtea et al. | |
| 7,851,727 B2 | 12/2010 | Burtea et al. | |
| 7,853,129 B2 | 12/2010 | Best | |
| 7,905,173 B2 | 3/2011 | Sus et al. | |
| 7,921,767 B2 | 4/2011 | Cook et al. | |
| 7,971,523 B2 | 7/2011 | Hartfelder et al. | |
| 8,033,213 B2 | 10/2011 | Cook et al. | |
| 8,087,407 B2 | 1/2012 | Wiker et al. | |
| 8,247,745 B2 | 8/2012 | Chung et al. | |
| 8,272,320 B2 | 9/2012 | Baker et al. | |
| 8,281,779 B2 | 10/2012 | Wiker et al. | |
| 8,371,285 B2 | 2/2013 | Wiker et al. | |
| 8,522,675 B2 * | 9/2013 | Veltrop | A23L 5/15 |
| | | | 219/214 |
| 8,656,904 B2 | 2/2014 | Wortman et al. | |
| 8,695,489 B2 | 4/2014 | Ewald et al. | |
| 8,839,714 B2 | 9/2014 | Schjerven, Sr. et al. | |
| 8,839,779 B2 | 9/2014 | Wiker et al. | |
| 8,997,636 B2 | 4/2015 | Kirby et al. | |
| 9,003,820 B2 | 4/2015 | Veltrop | |
| 9,433,321 B2 | 9/2016 | Piazzi | |
| 9,585,400 B2 | 3/2017 | Wiker et al. | |
| 9,585,401 B2 | 3/2017 | Wiker et al. | |
| 9,609,981 B2 | 4/2017 | Schjerven, Sr. et al. | |
| 9,693,655 B2 | 7/2017 | Shei et al. | |
| 9,746,842 B2 | 8/2017 | Reese et al. | |
| 9,788,652 B2 | 10/2017 | Greer | |
| D809,326 S | 2/2018 | Kestner et al. | |
| 9,976,750 B1 | 5/2018 | Kestner et al. | |
| 9,980,322 B1 | 5/2018 | Kestner et al. | |
| 10,004,358 B2 | 6/2018 | Wildebush | |
| 10,034,575 B2 | 7/2018 | Veltrop | |
| 10,039,289 B2 | 8/2018 | Wiker et al. | |
| 10,244,894 B2 | 4/2019 | Boltz et al. | |
| 10,362,898 B2 | 7/2019 | Schjerven, Sr. et al. | |
| 10,492,641 B2 | 12/2019 | Kestner et al. | |
| 10,512,363 B2 | 12/2019 | Kestner et al. | |
| 10,841,981 B1 | 11/2020 | Kestner et al. | |
| 10,852,002 B1 | 12/2020 | Kestner et al. | |
| 2003/0042248 A1 | 3/2003 | Witt et al. | |
| 2003/0056658 A1 | 3/2003 | Jones et al. | |
| 2008/0289619 A1 * | 11/2008 | Schjerven, Sr. | A47J 37/044 |
| | | | 126/41 R |
| 2010/0058936 A1 | 3/2010 | Schjerven, Sr. et al. | |
| 2010/0116147 A1 | 5/2010 | Chung et al. | |
| 2011/0114618 A1 | 5/2011 | Chung et al. | |
| 2011/0114624 A1 | 5/2011 | Chung et al. | |
| 2011/0114625 A1 | 5/2011 | Chung et al. | |
| 2011/0226230 A1 | 9/2011 | Reese et al. | |
| 2014/0199446 A1 | 7/2014 | Huegerich | |
| 2016/0296068 A1 | 10/2016 | Schjerven, Sr. et al. | |
| 2017/0035234 A1 | 2/2017 | Schjerven, Sr. et al. | |
| 2017/0290466 A1 | 10/2017 | Lundberg et al. | |
| 2017/0328598 A9 | 11/2017 | Wortman et al. | |
| 2018/0289209 A1 | 10/2018 | Yazvin et al. | |
| 2018/0296035 A1 | 10/2018 | Wildebush | |
| 2018/0338503 A1 | 11/2018 | Wiker et al. | |
| 2019/0290063 A1 | 9/2019 | Shei | |
| 2019/0328175 A1 * | 10/2019 | Bancroft | A47J 36/321 |
| 2019/0350407 A1 * | 11/2019 | Sharpe | A47J 37/0664 |
| 2019/0353527 A1 * | 11/2019 | Bassill | G01J 3/42 |

OTHER PUBLICATIONS

Examination Report for European Patent Application No. 20205055.5, dated Feb. 8, 2022.
"Nieco Model FH94 Gas Owner's Manual", Nieco, retrieved from https://nieco.com/wp-content/uploads/2020/04/FH94G-Manual-2020.pdf on Oct. 28, 2020.
"Nieco FH94 Back of House: The Broiler Built by Combining 45 years of BK Experience & Innovation", Nieco, published Oct. 2019, retrieved from https://nieco.com/wp-content/uploads/2019/10/Nieco-FH94-Sales-Sheet.pdf on Oct. 28, 2020.

* cited by examiner

COOKING APPLIANCE WITH COOKED FOOD HOLDING APPARATUS

CROSS-REFERENCE TO RELATED APPLICATIONS

This application claims priority of U.S. Provisional Patent Application No. 62/928,616, field on Oct. 31, 2019 and claims priority of U.S. Provisional Patent Application No. 62/930,882, filed on Nov. 5, 2019, both of which are incorporated by reference herein in their entireties.

BACKGROUND

The present disclosure relates to heat treatment of food. More specifically, the present disclosure relates to a warming and holding device for cooked food product in a cooking appliance. In various embodiments, the cooking appliance may be a broiler, oven, toaster, or the like for cooking, baking, or toasting a plurality of food items.

Heat transfer systems may be used to provide thermal energy to a broiler, oven, toaster, or the like for use in the heat treatment of food items to achieve cooking, baking, or toasting of the food item. Conveyor systems move the food item in relation to a heat transfer system to achieve a continuous cooking, baking, or toasting process. Similar conveyor systems are used in industrial applications for heat treatment, drying, and curing processes. In the present disclosure, the exemplary embodiment of a chain-driven charbroiler cooking a hamburger patty will be used, although it will be recognized that other forms of broilers, ovens, or toasters may be similarly configured and other foods, including, but not limited to pizza, pizza crusts, bread, buns, toasted sandwiches, chicken cuts or patties, fish cuts or patties, beef cuts, plant or other protein patties, or the aforementioned hamburger patties may be heat treated in the manners as described herein.

U.S. Patent Application Publication No. 2018/0289209 discloses a conveyor toaster which includes a conveyor assembly with a bracket and a conveyor belt. The conveyor belt rotates about the first and second gears. A drive motor operates to move the conveyor belt about The first and second gears. A platen is configured to be heated and is positioned relative to the conveyor belt. A mounting bracket is connected to the bracket of the conveyor assembly. Movement of the mounting bracket changes the position of the conveyor assembly relative to the platen. This application is incorporated by reference herein in its entirety.

U.S. Patent Application Publication No. 2019/0290063 relates to a heat transfer system and a broiler and is incorporated by reference herein in its entirety. The heat transfer system includes a mixing chamber that surrounds the heat source. An air inlet provides a flow of pressurized air into the mixing chamber. The mixing chamber directs the flow of air past the heat source or direct heating of the flow of air by the heat source. The flow of air is further directed out of the mixing chamber through an outlet to impinge upon a food product.

U.S. Patent Application Publication No. 2014/0199446 relates to a conveyor toaster with a housing and a split-conveyor; International Publication Number WO2020/091840 discloses a belted warmer assembly with a heated rotating drum, a belt roller, and a belt; U.S. Pat. No. 6,595,117 discloses a high-speed variable size toaster; and U.S. Pat. No. 9,585,400 discloses a conveyor oven with a sensor positioned to detect an event that will cause a decrease in the internal temperature of a tunnel, each of these references is incorporated herein by reference in their entireties.

Existing conveyor cooking appliances are generally not intended or certified to hold food product for any length of time once the cooking process is completed. For example, a conveyor broiler may cook eight hamburger patties in a cook cycle that lasts between seven to nine minutes, and each finished patty may exit the cooking conveyor at a temperature ranging between 155° F. and 170° F. Once deposited into a holding area, the finished patty may lose heat at a rate of approximately 1° F. per minute. As the minimum safe temperature for a cooked hamburger patty is 145° F., this means that if the patties are only removed from the holding area at the expiration of a nine-minute cook cycle, a user has potentially less than five minutes after the end of the cook cycle to either serve the food or move it to a temperature stable holding area. Since users of conveyor broilers often must perform other food preparation tasks during the patty cook cycle, there exists a risk of missing the expiration of the cook cycle and the window in which the cooked food is safe and palatable. Unsafe food conditions may result in the loss of food product to avoid delivery to unsafe food to customers. A cooking appliance that keeps cooked food product at safe and desirable temperatures for longer periods of time would therefore be useful.

BRIEF DISCLOSURE

An example of a heat transfer system for cooking a food product includes an enclosure that includes a food product inlet, a food product outlet, and a plurality of walls. At least one conveyor extends into the enclosure from the food product inlet. A plurality of heat sources are arranged about the at least one conveyor. The plurality of heat sources operate to output heat towards the at least one conveyor. A warming assembly is positioned within the enclosure below the at least one conveyor. The warming assembly defines a controlled environment. An opening into the warming assembly is configured to receive at least one pan through the opening. The at least one pan is configured to receive and store cooked food product.

In additional examples of the heat transfer system, a lower heating element is positioned within the warming assembly below the opening. The lower heating element is configured to output heat into the controlled environment of the warming assembly. An upper heating element is positioned within the warming assembly above the opening. The upper heating element is configured to output heat for a warming process of the warming assembly. A discharge ramp operates to deposit cooked food product from the at least one conveyor to the plurality of pans. The upper heating element may be spaced apart from the discharge ramp. The warming assembly may further include at least one lid removably positioned within the warming assembly at a location between the at least one pan and the at least one conveyor, wherein the at least one lid is configured to maintain the controlled environment about the at least one pan. The at least one lid may be combined with at least one upper heating element. The at least one lid may include a flexible heat barrier sheet.

In further examples of the heat transfer system, at least one heat source of the plurality of heat sources is arranged about the at least one conveyor is configured to provide heat energy to the warming assembly. At least one lower heat source may be positioned below the at least one conveyor and heat energy is directed from the at least one lower heat source into the warming assembly to heat the controlled environment. The warming assembly may be configured to hold the at least one pan in a position aligned below the at least one conveyor. The at least one pan may be configured to collect juice dripping from the cooked food product through the at least one conveyor.

The blocking element of the heat transfer assembly may be movably secured to the enclosure, whereby the blocking element is movable to an open position for movement of the at least one pan through the opening. The warming assembly may be detachably coupled to the enclosure. The blocking element may include a vertical planar component that defines the opening and a horizontal planar component that extends through the controlled environment above the at least one pan when the at least one pan is positioned within the warming assembly. The warming assembly may include a flexible heat barrier sheet. The heat barrier sheet may be fabricated from silicone. The blocking element may include an air curtain system having an air plenum with a plurality of orifices that operate to discharge a plane of air across the opening. at least one lid may be removably positioned within the warming assembly at a location between the at least one pan and the at least one conveyor. The at least one lid may be configured to maintain the control environment about the at least one pan.

In a further example of the heat transfer system come up the warming assembly further includes at least one indicator device that operates to indicate a status of one of the plurality of pans. A controller may be configured to receive a signal detecting a food product proximate the food product inlet, start a cook cycle time based upon receipt of the signal, determine that a subsequent food product is not proximate the food product inlet, and transmit a signal to the at least one indicator device to operate to indicate the status of a complete cook cycle. A loading assembly and a loading conveyor may be arranged proximate the food product inlet, wherein food products stored in the loading assembly are individually moved to the food product inlet by operation of the loading conveyor. An inlet sensor may be arranged proximate the food product inlet. The inlet sensor may include at least one of a photosensor, a camera, a laser time-of-flight sensor, an ultrasonic sensor, or a temperature sensor. The inlet sensor operates to produce the signal detecting the food product proximate the food product inlet.

DETAILED DISCLOSURE

Figure 1:
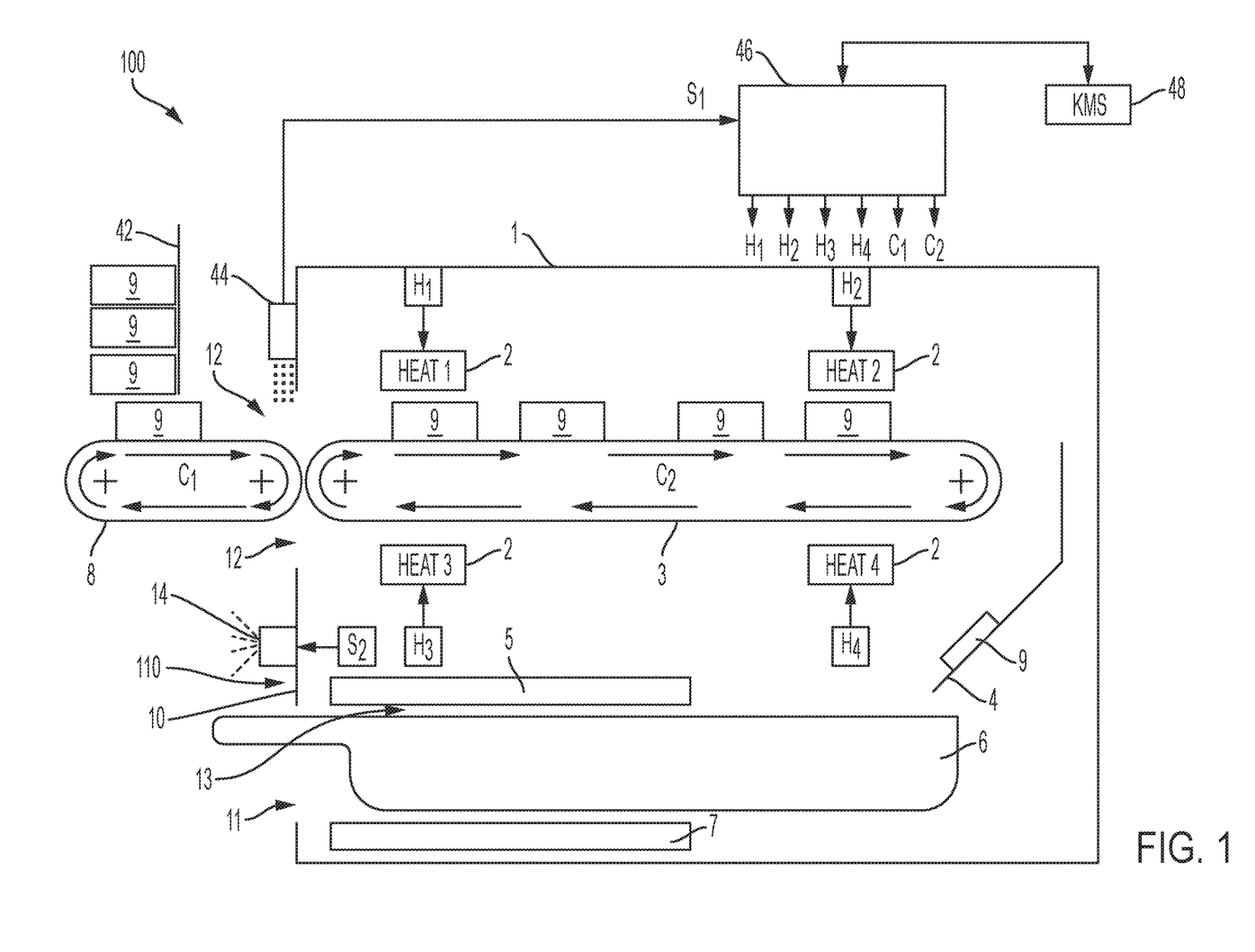
FIG. 1 depicts an example of a broiler with a warming assembly.

FIG. 1 depicts an example of a broiler 100. It will be recognized that the broiler 100 of FIG. 1 is merely exemplary and other examples will fall within the scope of the present disclosure that includes more or fewer components than depicted in FIG. 1. That is, a person of ordinary skill in the art will recognize from the present disclosure that the example shown and described with respect to FIG. 1 may be modified or rearranged or implemented with more or fewer systems or components and arrive at embodiments within the scope of the present disclosure.

Broiler 100 is shown to include multiple heat transfer elements or heat sources 2 surrounded by an enclosure 1. Each heat source 2 as exemplarily described herein may be a gas burner. In other examples, the heat sources 2 may be electric heating elements, infrared heating elements, or any other suitable form of heating element as would be recognized by one of ordinary skill in the art. Although FIG. 1 depicts the broiler 100 as including four heat sources 2, other embodiments may include one, two, or any other desired number of heat sources 2, in any arrangement or configuration, as will be recognized by a person having ordinary skill in the art in view of the present disclosure. Further examples and details of heat transfer devices, including broilers, as may be used with the disclosure as provided herein are described in U.S. Patent Application Publication No. 20190290063, entitled "Heat Transfer System," which is incorporated by reference herein in its entirety.

The enclosure 1 is formed by a plurality of walls. The walls of the enclosure 1 may be constructed of sheet metal. The enclosure 1 includes a food product inlet 12 that permits the ingress of a food product 9 to the cooking area exposed to heat sources 2 and encapsulated by the enclosure 1. The enclosure 1 further includes a food product outlet 11 that permits the egress of the food product 9 from the cooking area encapsulated by the enclosure 1. The types of food product 9 cooked by a cooking appliance as described herein may include raw, uncooked, par-baked, or frozen versions of food products. The food products may have a variety of sizes or weights, and may include, but are not limited to, hamburger patties, chicken breasts, bread, and pizza.

Food product 9 may be supplied to the food product inlet 12 using a loading conveyor 8 and a loading assembly 42. Operation of the loading conveyor 8 moves food product 9 toward the food product inlet 12 of the enclosure 1. The loading assembly 42 may be any suitable device configured to store multiple food products 9 and to automatically deposit food product 9 onto the loading conveyor 8, which may for example be a hopper or magazine. In this way, a cooking cycle can be completed for a desired amount of food product 9 even when the desired amount of food product 9 exceeds a capacity of the enclosure 1. In other words, a cooking cycle for thirty hamburger patties can be completed for an enclosure 1 with a maximum capacity of five patties without the need for manual intervention. However, in other examples, both the loading conveyor 8 and any associated loading assembly may be omitted from the broiler 100, and food product 9 may be manually inserted into the enclosure 1 by a user.

Food product 9 is moved through broiler 100 on a cooking conveyor 3. In an example, heat sources 2 are situated both above and below the cooking conveyor 3 in order to complete a cooking process of the food product 9. Although FIG. 1 depicts the cooking conveyor 3 as fully contained within the enclosure 1, in other examples, the cooking conveyor 3 can extend to or beyond the food product inlet 12. For example, the cooking conveyor 3 may extend beyond the cooking inlet 12 and to the exterior of the enclosure 1 in cases where the loading conveyor 8 is omitted from the broiler 100. The broiler 100 may further include an inlet sensor 44. It will be recognized that more or fewer sensors may be used in association with other embodiments while remaining within the scope of the present disclosure. Inlet sensor 44 may be any type of sensing device configured to collect data indicating the presence of a food product 9 in the vicinity of the food product inlet 12. Although the inlet sensor 44 is depicted as positioned on the exterior of the enclosure 1 and above the cooking conveyor 3, in other examples, the inlet sensor 44 may be located on the interior of the enclosure 1, level with the cooking conveyor 3, or above the loading conveyor 8. The position of the inlet sensor 44 may be dependent on the field of view or the observable space the inlet sensor 44 is able to detect. In examples of broilers with more than one cooking conveyor 3, the broiler 100 may further include multiple inlet sensors 44.

In various examples, the inlet sensor 44 may be a photosensor or camera, a laser time-of-flight sensor, an ultrasonic sensor, or a temperature sensor. The type of inlet sensor 44 may dictate the means of detecting the presence of the food product 9 in the food product inlet 12. For example, a photosensor or camera may be configured to distinguish an outline of the food product 9 (e.g., a round hamburger patty) from a cooking conveyor 3. Similarly, a temperature sensor may be configured to distinguish a surface temperature of a food product 9 (e.g., a frozen or refrigerated hamburger patty) from a surface temperature of the cooking conveyor 3.

Inlet sensor 44 transmits collected data as data signal $S_1$ to a controller 46. The controller 46 may be internal to the broiler 100 or it may be external to the broiler 100. In an example, the controller 46 is a computer processor that is located within the broiler 100, in a location shielded from the heat, humidity, and food particles of the broiler 100. In another example, the controller 46 is a computer that is located remotely from the broiler 100 and for example, receives the sensor data either through wired or wireless communication and returns control signals as described in further detail herein through a similar communicative connection.

The computer processor of controller 46 may be integral with or communicatively connected to a computer-readable medium upon which computer-readable code is stored. Upon execution of the computer-readable code by the processor, the processor performs functions and calculations and subsequently transmits control signals to the heat sources 2, the loading conveyor 8, and the cooking conveyor 3. The same or another computer-readable medium may be communicatively connected to the processor and cooking models may be stored thereon for access and use by the processor. These cooking models may correlate control temperatures $B_1$-$B_4$ for the heat sources 2 and control speeds $C_1$ and $C_2$ for the loading conveyor 8 and the cooking conveyor 3.

The controller 46, executing the computer-readable code and informed by the cooking models operates the various components of the broiler 100 at different conditions, for example, to provide more or less heat at the top or bottom of the food product 9, or to control the speed of the cooking conveyor 3 to control the overall cooking time. Control of the cooking conveyor 3 can determine the cooking time or time that the food product 9 is exposed to particular conditions created by one or more heat sources 2 adjacent to the cooking conveyor 3. Control of the heat sources 2 includes adjustment of the heat input into particular locations within the enclosure 1. All of these components provide control over the cooking process and therefore can be changed to accurately and repeatedly cook different types of food.

In some embodiments, the controller 46 is communicatively connected to a kitchen management system (KMS) 48 and receives cooking models or other control signals therefrom. In various embodiments, the KMS 48 may be directly communicatively connected to the broiler 100 or may be communicatively connected to the broiler 100 through an internet-of-things (IoT) communications system which provides distributed communication to communication-enabled devices in the kitchen, including the broiler 100. The warming assembly 110 may further include an indicator light 14 positioned on the exterior of the enclosure 1. While a single indicator light 14 is depicted, in other examples, the warming assembly 110 may include two or more indicator lights 14. Each indicator light 14 may be electrically controlled and may respond to sensors or timers that determine when food product has been deposited in the pan 6.

In other examples, as provided herein, the indicator devices 14 may include any device that alerts the user to the completion of a cook cycle, that is, a need to remove a pan 6 from the warming assembly 110 after such pan 6 has been filled with cooked food product 9. For example, the indicator device 14 may be a light that illuminates to provide a visual alert or a speaker that emits a sound to provide an audible alert. In some cases, the indicator device 14 may include a user interface display or a component of a user interface display that displays a message to a user upon completion of a cook cycle. The indicator device 14 may be communicatively connected to the controller 46 and may provide a cook cycle alert responsive to a control signal S2. Further details of a process for determining a length of a cook cycle and indicating the completion thereof are described subsequently herein.

One or more indicator devices 14 may be used in examples of the broiler 100 for example to accommodate multiple cooking conveyors of a boiler. Each cooking conveyor may be configured to deposit finished food product 9 into a different pan six. An indicator device 14 located proximate to the respective pan 6 and illuminate corresponding to the status of the cook cycle of that associated conveyor 3/pan 6. For example, if some cooked food product 9 has been deposited into a pan 6 but the cook cycle is still ongoing come at the indicator light 14 may be illuminated red to indicate to a user that additional cooked food product 9 will be deposited into the pan set before the end of the cook cycle, and thus the user should not yet remove the pan 6 from the warming assembly 110. Once the cook cycle has expired and the full batch of cooked food product 9 has been deposited into the pan 6, the indicator light 14 may be illuminated green to indicate to a user that the pan 6 is ready to be removed probably warming assembly 110. If the cook cycle has been completed for a set amount of time without the full pan 6 being removed, the indicator light 14 may illuminate yellow to indicate that the food product 9 has been held for a long time.

In various other examples come up the indicator device 14 may instead be an LED display or an LCD that includes a message component that is configured to display a status of the broiler or the pan (e.g., "Ready," "Cycle in Progress"). In some implementations, the indicator device 14 may be common to all of the pans 6 within the warming assembly 110, and the message component may be configured to indicate the status of each pan six. For example, the messages displayed by the message component may include "Pan 1 Ready,' "Pan 3 Cycle in Progress" or the like. Such a message component may be presented in conjunction with an indicator white as described above.

A food product discharge ramp 4 is shown to be situated within the enclosure 1 at the end of the cooking conveyor 3, opposite the food product inlet 12. The food product discharge ramp 4 may be any device or assembly that deposits finished food product 9 in a desired location for further preparation, service, or storage. Will be described in further detail herein, in examples the discharge ramp 4 further redirects the finished food product 9 in a direction generally opposite the direction in which the food product 9 is moved by the conveyor 3. That is, in examples, if the conveyor 3 moves the food product 9 from the inlet 12 at the front of the broiler toward a rear of the broiler, the discharge ramp 4 redirects the food product 9 towards the front of the broiler 100.

The food product discharge ramp 4 may deposit finished food product 9 into a warming assembly 110. In an example, the warming assembly 110 is disposed within the enclosure 1 and beneath the cooking conveyor 3. In the example of FIG. 1, the warming assembly 110 is shown to include an upper heating element 5, a lower heating element 7, and a blocking element 10. In other examples as described herein, one or both of the upper heating element 5 and the lower heating element 7 may be replaced instead with heat redirected from at least one of the heat sources 2. Variations of the warming assembly 110 are disclosed herein and all are considered to be within the scope of the disclosed warming assembly 110 as well as other combinations of these disclosed variations although not explicitly shown.

Any of a variety of heating element may be utilized for one or both of the upper heating element 5 and the lower heating element seven of the warming assembly 110. In some implementations, certain features of the heating element may be used in combination with each other. One example of a heating element is resistive electrical wire that is bonded to a heater plate. They resist of electrical wire generates heat through the phenomena of jeweled heating, in which passage of an electric current through a conductor produces heat. A CALROD is a specific type of resistance heater. A heating plate or a reflector may help to directly feed energy. In another example, an air plenum includes a resistive wire heating element located in a conduit that fluidly couples a fan and direct heated air into the controlled environment 13. In another example, hot exhaust air may be supplied to the controlled environment from the broiler. U.S. Pat. No. 7,800,023, entitled "Conveyor Oven with Hybrid Heating Sources," or U.S. Pat. No. 8,522,675 or 9,980,322 provide additional examples of heat sources, and are incorporated by reference herein in their entireties.

It will be recognized that in further examples, the warming assembly 110 may include only an upper heating element or a lower heating element. In still further examples, the upper heating element may be ducting or other heat transfer element that uses heat from one or more of the heat sources 2 from the broiler to heat the warming assembly 110. The heat transfer element may include a heat exchanger that is warmed by one or more of the heat sources 2 and redirects heat energy from the one or more heat sources 2 into the warming assembly 110 and the pan 6.

As disclosed herein, the warming assembly 110 defines a controlled environment 13 within the enclosure 1 configured to receive cooked food products 9. The controlled environment 13 is configured to provide a humidity and/or temperature greater than that of the ambient conditions outside of the enclosure 1. The humidity and/or temperature of the controlled environment 13 helps to prolong the palatability of the broiled food products.

The controlled environment 13 is further defined by an air flow blocking element 10 that defines the outlet 11 between the controlled environment 13 and the exterior of the enclosure 1. The airflow blocking element 10 is configured to limit both the egress of warm air out of the controlled environment 13 through the outlet 11 and the ingress of cool air into the controlled environment 13 through the outlet 11. The blocking element 10 reduces the outlet 11 in at least one of a vertical or horizontal dimension to a size less than or equal to the same dimension of the controlled environment 13. The variations of the blocking element 10 disclosed herein therefore help to trap warm and humid air in the vicinity of the pan 6 while limiting exposure to cooler and drier ambient air. in some examples come up the airflow blocking element 10 is integrally formed with the enclosure 1. In other examples, the airflow blocking element 10 is a separate component that is movably or detachably coupled to the enclosure 1.

The use of a lid or placement of the upper heater to act as a lid further blocks airflow and/or circulation about the cooked food product 9 within the pan 6. This promotes a controlled environment 13 with an elevated humidity relative to the ambient as well as elevated over that about the cooking conveyor 3. The humid condition helps in the holding of broiled foods, for example, hamburger patties.

At least one holding pan 6 is situated in the controlled environment 13. Although the pan 6 depicted in the examples herein as a container having a plurality of sidewalls and a handle that extends out of an outlet 11 the warming assembly 110, in other examples, the pan 6 may be any size or shape required to receive cooked food product 9 and transport the cooked food product 9 from the broiler 100. For example, in some implementations, the pan 6 may be a tray with shallow sidewalls and without a handle. However, the warming assembly 110 is configured to receive at least one, and in some examples more than one, pan 6.

Figure 2:
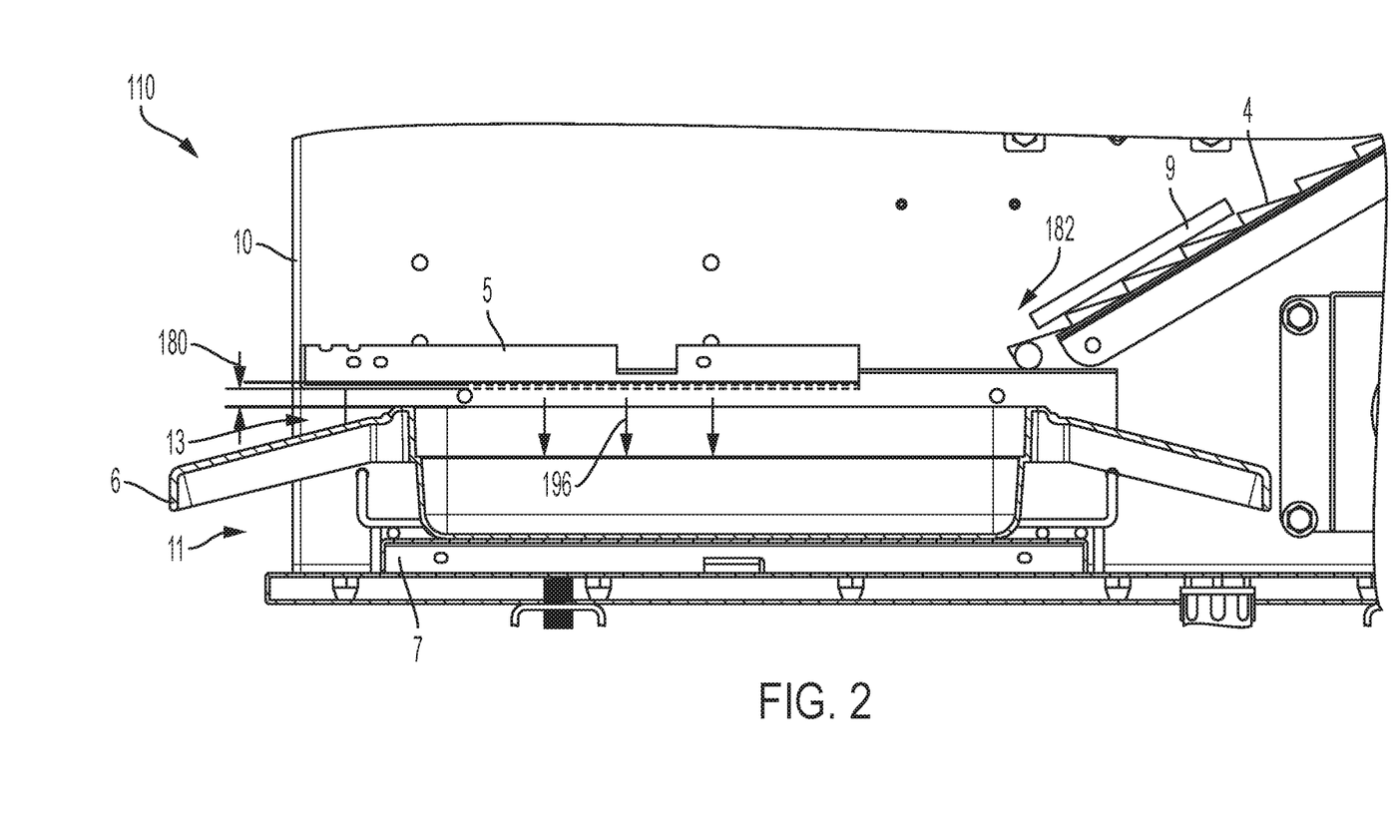
FIG. 2 depicts an example of a warming assembly.

In examples, the pan 6 rests on top of or directly contacts the lower heating element 7, while the upper heating element 5 may be spaced apart from an upper lip of the warming pan 6. FIG. 2 depicts an additional example of the warming assembly 110. A pan 6 is shown to be situated between an upper heating element 5 and a lower heating element 7. In order to minimize the effects of cool air flowing through the outlet 11 and onto the food product within the pan 6, the blocking element 10 and the upper heating element 5 are situated at a vertical dimension 180 from an upper edge of the pan 6. In an example, vertical dimension 180 may range from zero inches to two inches. In further examples, vertical dimension 180 is less than one inch or less than ½ inch. In an example, the upper heating element 5 is positioned in contact or nearly in contact with a top lip of the pan 6. In this arrangement, the upper heating element 5 operates as a combined heating element and lid. This arrangement of the upper heating element 5 relative to the pan 6, further reduces the controlled environment 13 about the pan and further helps to retain humidity within the pan 6 about the stored cooked food products 9. This limitation of the controlled environment helps to provide the humid and/or moist conditions for preservation of palatability of the food product 9. The upper heating element emits heat in the direction 196 towards the pan 6. However, it will be recognized that such arrangement may also reduce access into the pan for loading the pan 6 with cooked food product 9. Therefore, the heating element 5 may terminate before the discharge ramp 4, for example in region 182. In this way, finished food product 9 is afforded more space in the region 182 to enter the pan 6.

A user may remove the pan 6 through the outlet 11 to serve the cooked food product 9 or to move the pan 6 to a holding cabinet. U.S. Pat. No. 8,522,675, entitled "Holding Cabinet for Separately Heating Food Trays," and U.S. Pat.

No. 9,980,322, entitled "Multi-Zone Food Holding Bin" provide examples of holding cabinets with heating elements, and are incorporated by reference herein in their entireties.

The broiler 100 exemplarily includes multiple of many components and systems. Thus, it will be recognized from this disclosure that embodiments of the broiler 100 may include one, two, or more than two of these disclosed systems in a manner so as to provide desired cooking appliance capacity, product flexibility, and efficiency. For example, in some implementations, the broiler 100 may include two or more cooking conveyors 3 arranged in a parallel configuration within the enclosure 1. Each cooking conveyor 3 may be associated with a separate discharge ramp 4 that deposits cooked food product 9 into a separate pan 6.

Figure 3:
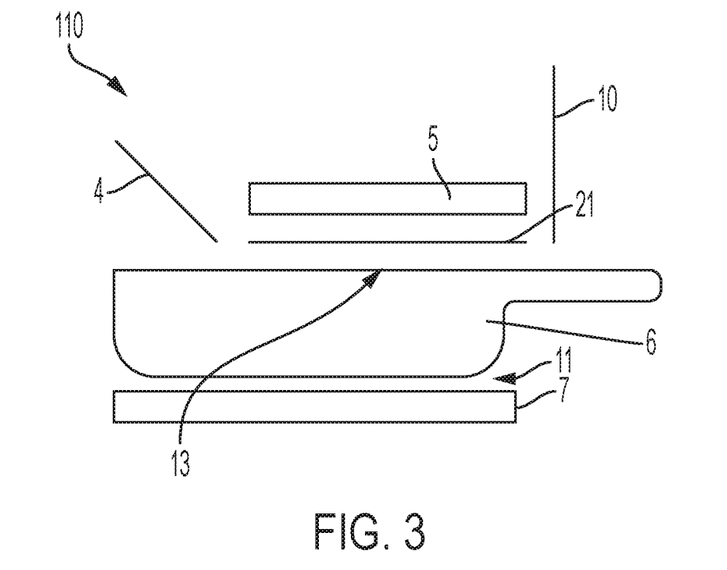
FIG. 3 depicts a schematic representation of warming assembly with a removable pan lid.

FIG. 3 depicts an example warming assembly 110 with a removable lid 21 situated between the heating element 5 and the warming pan 6. The lid 21 may be held at a fixed vertical distance from the top of the pan 6, or it may contact an upper edge of the pan 6, thus creating an airtight or semi-airtight seal. The lid 21 may be configured to only extend along a partial length of the pan 6, for example, the ½, ⅔, or ¾ along the length of the pan 6 from the opening into the warming assembly 110. In an example, this provides a space relative to the discharge ramp 4 for the pan 6 to receive food items therein. The lid 21 may rest on brackets in a position suspended above the pan 6. The lid 21 may further be retained within the warming assembly 110 either by the blocking element 10 as an extension of the exterior of the enclosure 1 or any of a variety of know retention clips or ledges may releasably retain the lid 21 within the warming assembly 110. The pan 6 may thus be movable relative to the lid 21 and remain within the warming assembly 110 while different pans 6 are placed into the warming assembly 110 and removed therefrom. Whereas the heating element 5 may be a fixed component within the warming assembly 110, the lid 21 may be easily removable through the outlet 11 for cleaning purposes. Lid 21 may have a variety of different geometries to achieve various heat transfer or air-blocking profiles. In other examples, the lid 21 may be selectively omitted by the user from the warming assembly 110 when a dry air profile is desired, for example, when the warming pan 6 holds crispy food products.

In another example, the upper heating element 5 depicted in FIG. 3 is optional. Heat from the heat sources 2 may be used and/or redirected into the controlled environment instead of use of an upper heating element 5. The lid 21 helps to retain humidity in the pan 6, therefore, the lid 21 still helps to maintain the controlled environment 13 in combination with heat supplied from the heat sources 2. The lower heating element 7 may also optionally be used to contribute heat to the controlled environment 13.

Figure 4:
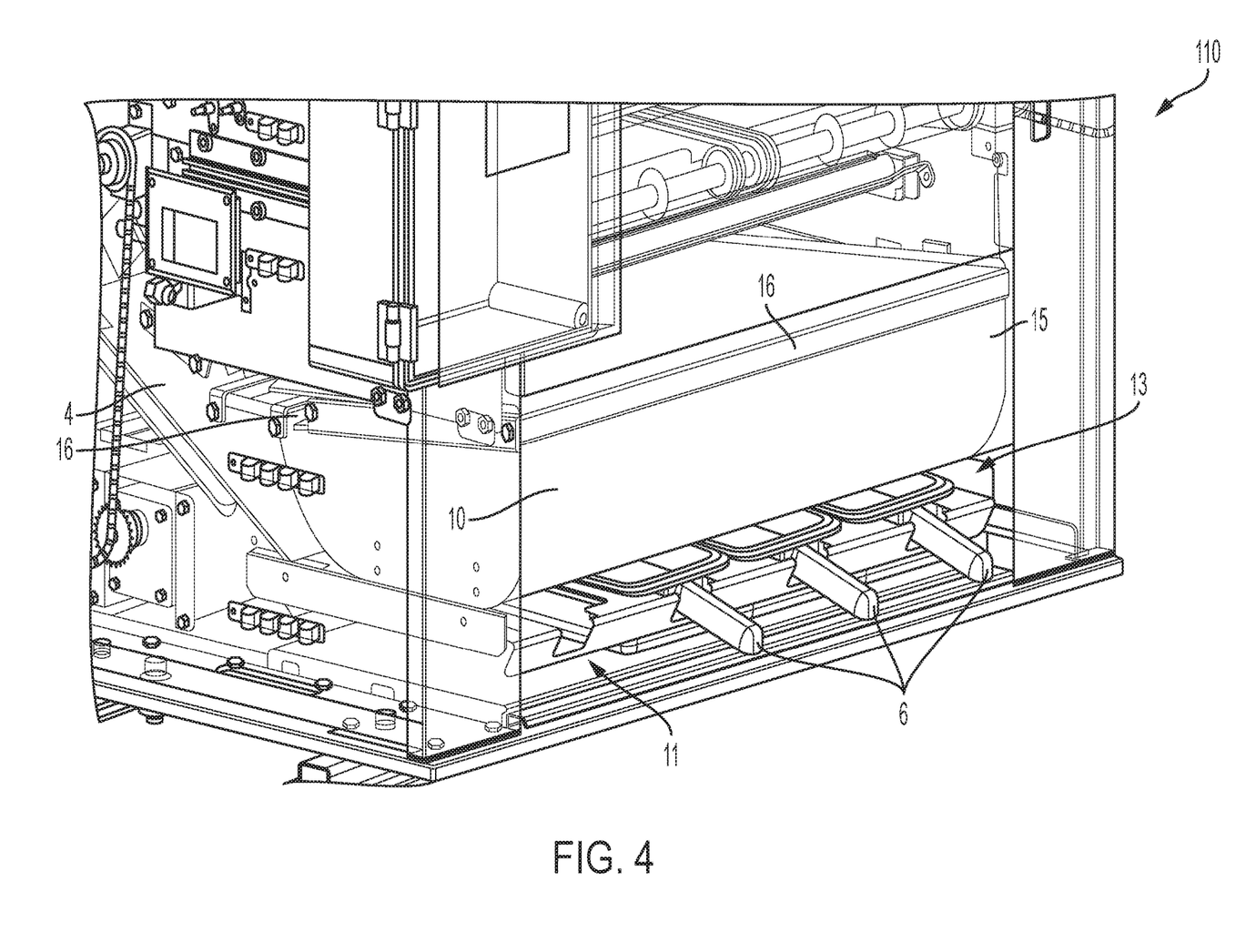
FIG. 4 depicts an example of a warming assembly with a heat barrier shield.

FIG. 4 depicts an example warming assembly 110 with a lid in the form of a flexible heat shield 15. As with the examples described above, the flexible heat shield can be used with or without the upper heating element 5. The shield 15 may be sized and mounted at mounting points 16 such that the shield 15 touches the rim of the warming pan 6 and creates a seal on some or all of the perimeter of the opening of the pan 6. This seal traps warm, moist air in the pan 6, improving food temperature and quality. The flexible heat shield 15 may be suspended above the warming pans 6 along mounting points 16 to both prevent the escape of warm, moist air from the warming pans 6 and the ingress of cool air into the warming assembly 110 through the outlet 11. Advantageously, the flexibility of the flexible heat shield 15 may permit its use with warming pans 6 having a wide a variety of shapes and sizes. In examples, the flexible heat shield 15 is fabricated from silicone, although in other examples, the flexible heat shield 15 can be fabricated from another flexible food and heat-safe material. In an exemplary embodiment, the flexible heat shield 15 extends the full width of the warming assembly 110. In other examples, the flexible heat shield 15 extends for a portion of the width of the warming assembly 110.

Figure 8:
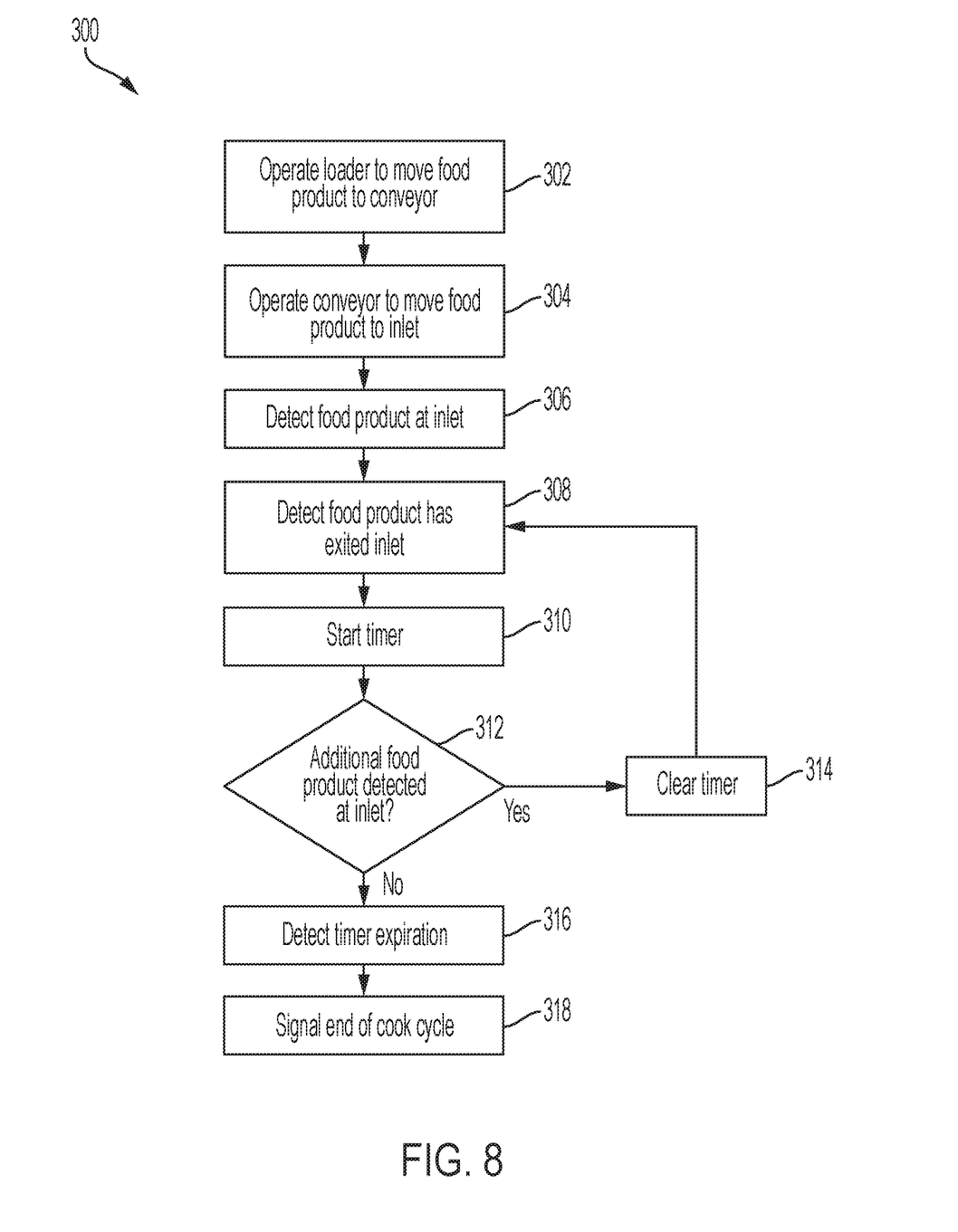
FIG. 8 is a flow chart that depicts an example of a method of detecting the length of a cooking cycle.

FIG. 8 depicts an example of a blocking element 10 in the form of a front shield component and the implementation of the front shield component in the warming assembly 110, similar to that as shown in FIG. 1. The front shield component may include a substantially planar component 140 with bracket components 142 that extend perpendicularly rearward from the planar component 140. In various examples, the bracket components 142 are integrally formed with the planar component 140. The bracket components 142 may be utilized to fixedly couple the front shield component to the enclosure 1 of the broiler 100. In an exemplary embodiment, the planar component 140 spans the full width of the warming assembly 110. In other examples, the planar component 140 only spans a portion of the width of the warming assembly 110. Therefore, while blocking element in the form of a shield may extend across multiple pans, in other examples, one blocking element may be provided in association with each of the positions for pans 6 to be held in the warming assembly 110.

In another example, the blocking element 10 may be in the form of a front shield component where the substantially planar component 140 is movably secured to the enclosure 1. The substantially planar component 140 may be rotatably coupled to the enclosure 1 along an upper edge 144 of the planar component 140. In this way, pans 6 situated behind the planar component 140 are substantially protected from cooling air flow entering through the outlet 11 until a pan 6 must be removed from the warming assembly 110. At that time, a user may grip the planar component 140 and rotate it upwards as indicated by arrow 146 in order to expose the pans 6. In further implementations, the planar component 140 may be slidably attached to the enclosure 1, or a combination of rotary and slidable attachment. Blocking element 10 may further include handles or other grip features to facilitate movement. In addition, any or all of the components of blocking element 10 may be fabricated from a transparent mutual (e.g. glass) to permit users to see the finished food product as deposited in the pans 6.

Figure 5:
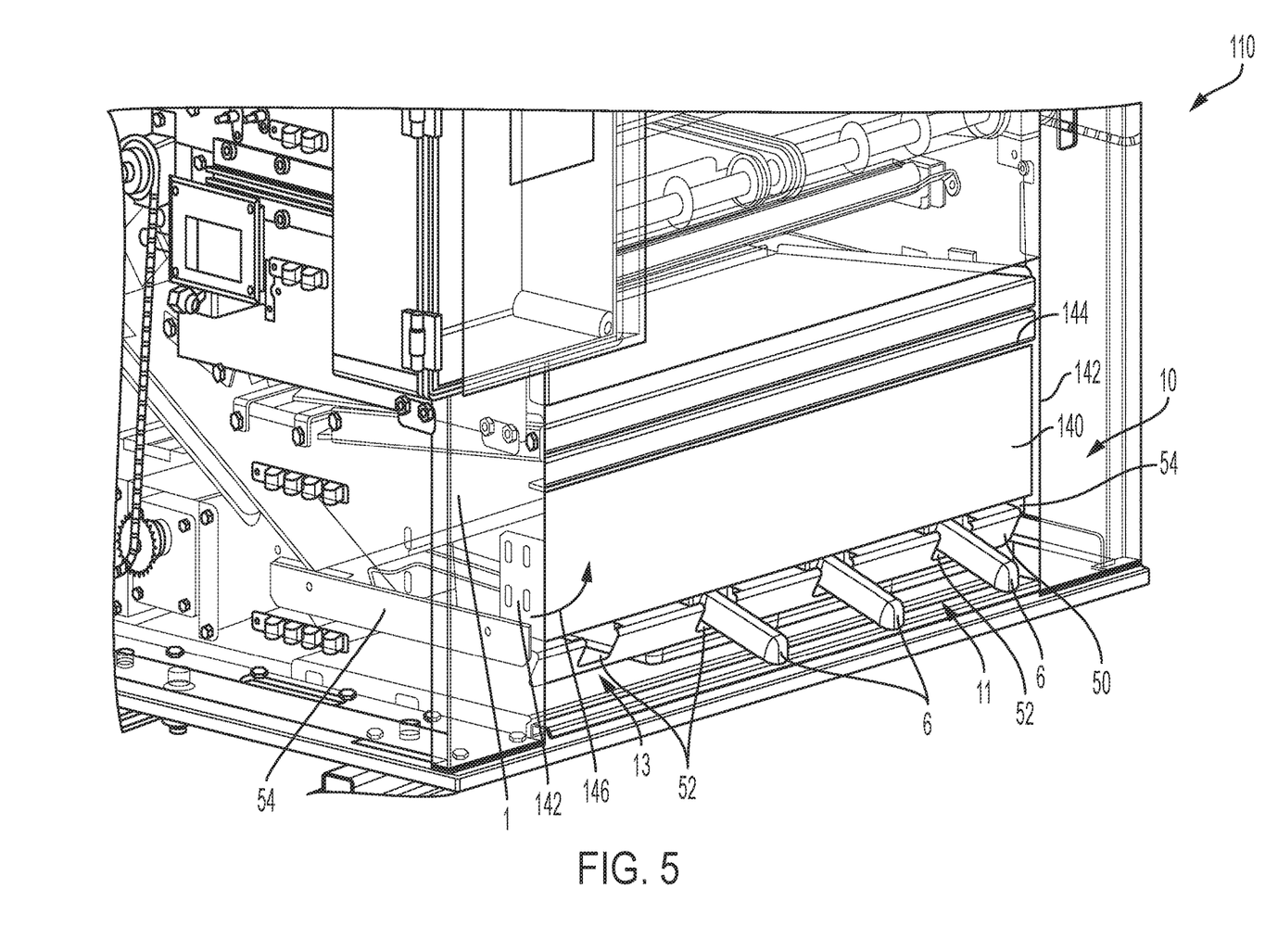
FIG. 5 depicts an example of a warming assembly.

FIG. 5 further depicts a pan drawer 50 which is an optional feature which may be used in any of the examples of warming assemblies 110 as described herein. The pan drawer 50 exemplarily is movably retractable within the controlled environment. For example, the pan drawer 50 includes apertures 52 within which the pans may be inserted. This properly locates the pans 6 within the warming assembly 110 when the pan drawer is inserted back into the warming assembly 110. The pan drawer 50 exemplarily slides along rails 54 built into the interior of the warming assembly 110, for example interior of the enclosure 1.

Figure 6:
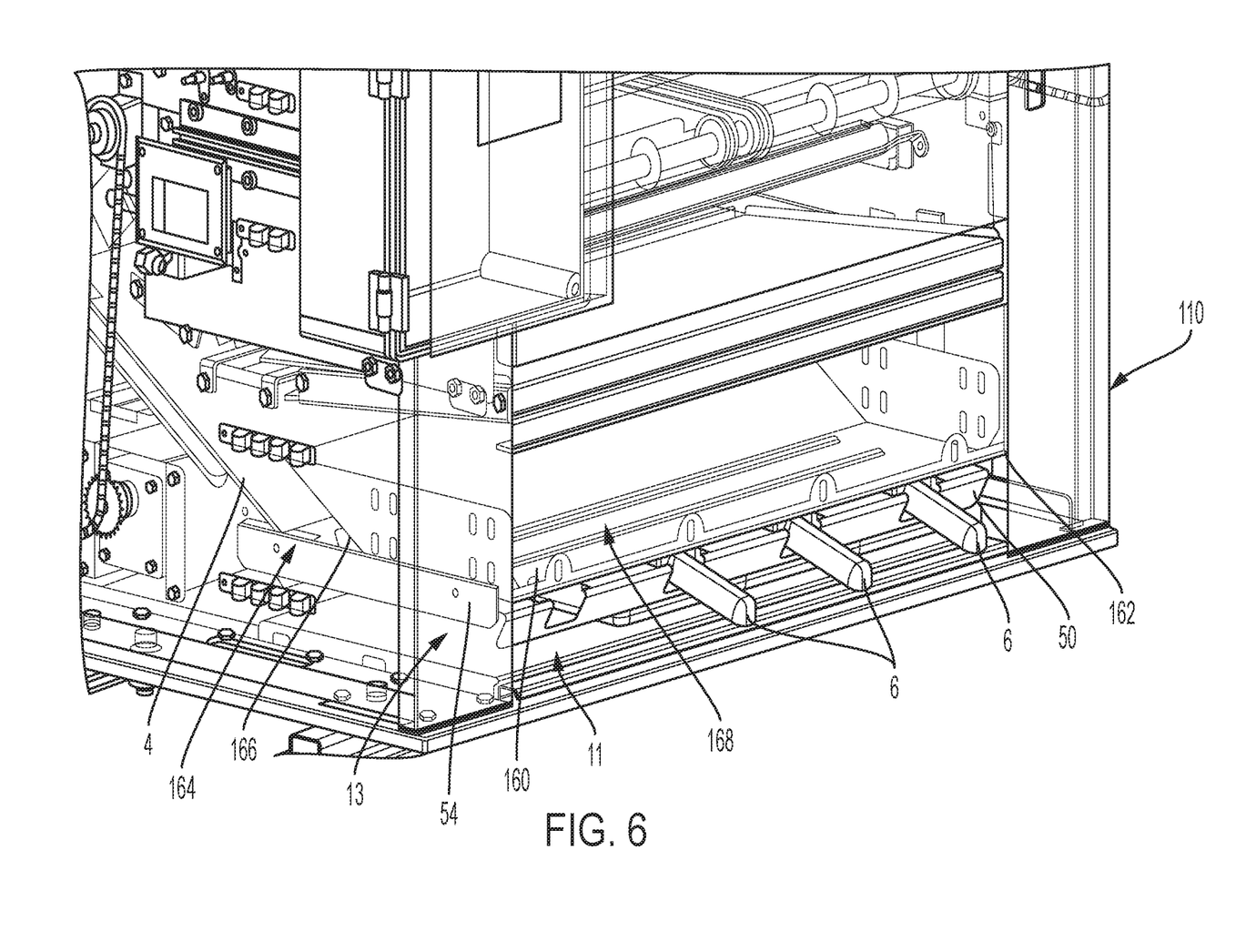
FIG. 6 depicts a further example of a warming assembly.

FIG. 6 depicts a blocking element 10 that exemplarily combines multiple features of previously disclosed blocking elements. It will be recognized that many other examples of blocking elements are arrived at through the combination of features as previously disclosed herein, not just such combination featured in FIG. 6. The example blocking element 10 combines features of a lid and a front shield component as both previously described. Therefore the blocking element 10 of FIG. 6 includes a lid portion 160 and a front shield portion 162. The front shield portion 160 reduces the size of the outlet to limit ingress and egress to the controlled environment 13, while the lid portion 160 further reduces the controlled environment 13 space about the pan 6. The lid portion 160 is shown to include a substantially planar component 168 and also an inclined component 166. As previously discussed with respect to FIG. 2, a pathway is needed from the discharge ramp 4 into the pans 6 in the controlled environment 13 of the warming assembly 110. In the region of 164, the lid portion 160 includes inclined component 166 which may but is not required, be oriented at an angle that matches an angulation of the discharge ramp. The inclined component may help to further retain heat and moisture within the controlled environment while also permitting the cooked food product to slide down the discharge ramp into the pans 6. In some examples, the lid portion 160 may include integral heating elements (e.g., resistive wire heating elements) to further operate as a combined lid and upper heating element to preserve the temperature and quality of the food product in the pans 6 located beneath the lid portion 160.

Figure 7:
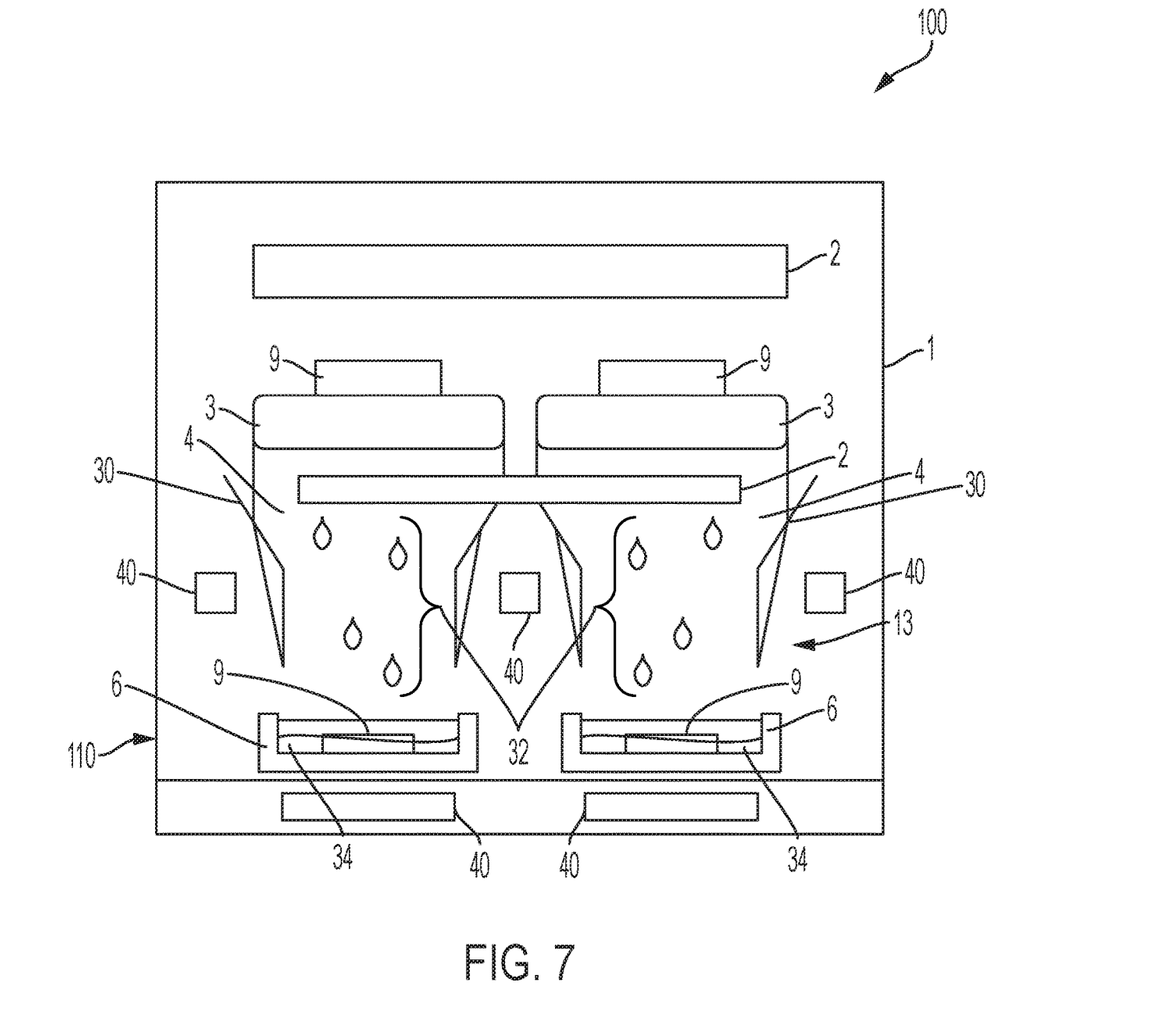
FIG. 7 depicts a schematic example of a broiler with a warming assembly.

FIG. 7 depicts a still further schematic example of a broiler 100. It will be recognized that features herein may be combined with features described previously although not explicitly shown in FIG. 7 while remaining within the present disclosure. Two cooking conveyors 3 are provided upon which food products 9 are moved through the enclosure 1. However, it will be recognized that one or three or more cooking conveyors 3 may also be used in examples within the present disclosure. Heat sources 2 are provided above and exemplarily below the cooking conveyors 3 and are configured to direct heat into the food products 9 moved on the cooking conveyors 3. As previously described, a discharge ramp 4 is positioned at an opposite end of the cooking conveyors 3 to direct cooked food products 9 into the pans 6 located within the controlled environment 13 of the warming assembly 110.

The warming assembly 110 is exemplarily configured to rely upon the heat supplied from the heat sources 2 rather than any additional heating sources. However, it will be recognized that optionally one or more warming heaters may be located within the warming assembly, for example at one or more of locations 40 identified in FIG. 7, or other positions as described previously. The warming assembly 110 is configured such that liquid 32 falling from the food products 9 on the cooking conveyors 3 is directed into and collected within the pans 6 as pooled liquid 34. The pooled liquid 34 exemplarily includes water, grease, fat, and bits of food. The pooled liquid 34 helps to maintain the temperature and humidity of the food products 9 in the pans 6 while in the warming assembly 110. Because each cooking conveyor 3 operates through a cook cycle to cook food products 9 to fill the pan 6, an expected amount of liquid 32 can be accounted for in the volume of the pan 6. In broilers, collection of the liquid 32 in grease traps or pans is a constant source of maintenance and cleaning. In the present example, the collected liquid 34 is removed from the broiler after each cook cycle, preventing buildup of grease and fouling of components within the broiler. In examples, shields 30 may be located within the warming assembly to help direct the liquid 32 from the cooking conveyors 3 into the pans 6. In an example, the shields 30 may collect the liquid 32 and divert it onto the discharge ramp 4 wherein the liquid 32 is directed into the pan 6 along with the cooked food product. In still further examples, these shields 30 may further block the liquid 32 from impinging upon the lower heat source 2 or to avoid upper heat elements, for example at locations 40 or other locations.

In examples as disclosed herein, control and monitoring of a cooking cycle of a broiler is disclosed. The method of FIG. 13 provide further examples and details of manners in which the broiler 100 may be controlled. It will be recognized that features and elements of the broiler 100 and method 300 of control thereof may also be implemented with respect to any of the broiler features as previously presented. FIG. 8 is a flow chart that depicts an exemplary embodiment of a method 300 of detecting the length of a cooking cycle, for example, using the broiler 100 depicted in FIG. 1 or any other broiler configuration as will be recognized in view of the present disclosure. It will be recognized that the controller 46 may execute computer-readable code as previously described to carry out the functions and perform the control operations as described in the performance of method 300.

At 302, the controller 46 operates the loading assembly 42 to move the food product 9 to the loading conveyor 8. Once deposited on the loading conveyor 8, at 304, the controller 46 operates the loading conveyor 8 to move the food product 9 to the food product inlet 12. As noted above, in some embodiments, the broiler 100 does not include one or both of the loading conveyor and the loading assembly 42. In these embodiments, a user may manually place food product 9 onto the cooking conveyor 3.

Next, at 306 the controller 46 detects the presence of the food product 9 at the food product inlet 12. The controller 46 detects the presence of the food product 9 based on data received from the inlet sensor 44. The data collected by the inlet sensor 44 may include product size, density, weight, temperature, or the like. The controller 46 may compare the data received from the inlet sensor 44 with food product parameters stored in the computer-readable medium of the controller 46. For example, the food product parameters may include expected weights, sizes, or shape outlines of food products, expected temperatures for refrigerated or frozen food products, or the like.

At 308, the controller 46 detects that the food product 9 has exited the food product inlet 12. In some examples, the controller 46 detects that the food product 9 has exited the inlet 12 using additional data collected by the inlet sensor 230. For example, if the inlet sensor 44 is a temperature sensor, the controller 46 may detect that the food product 9 has passed beyond the product inlet 12 and out of the field of view of the inlet sensor 44 once temperature data received from the inlet sensor 44 increases, signaling that the inlet sensor 44 is detecting a surface temperature of the cooking conveyor 3 rather than a surface temperature of a frozen food product 9.

In some examples, the controller 46 does not perform both 306 and 308 based on the data received from the inlet sensor 44. Instead, the controller 46 may perform either step 306 or 308 based on data received the inlet sensor 44, and infer the corresponding step based on the operating characteristics of the broiler 100. For example, the controller 46 may detect the presence of the food product 9 at the food product inlet 12 once the food product 9 enters the field of view of the inlet sensor 44. Subsequent to this performance of step 306, the controller 46 may determine that the food product 9 has exited the field of view of the inlet sensor 44 based on the speed of the cooking conveyor 3 and the size of the food product 9, rather than data received from the inlet sensor 44.

At 310, the controller 46 starts a timer. In an exemplary embodiment, the timer value is stored in the computer-readable medium of the controller 46 and is configured to increment continuously until reaching a target value or until otherwise interrupted by the controller 46. At 312, the controller 46 determines whether additional food product 9 has been detected by the inlet sensor 44 at the food product inlet 12. In response to a determination that additional food product has been detected, method 300 continues with 314 in which the controller clears the timer (i.e., resets the timer to an initial value). Upon clearing the timer, method 300 reverts to 308 and the controller 46 waits to detect that the food product 9 is no longer in the field of view of the inlet sensor 44 and therefore has passed beyond the food product inlet 12.

However, if at 312 the controller 46 determines that additional food product 9 has not been detected at the inlet 12 (i.e., sensor data from the inlet sensor 44 does not indicate the presence of a food product 9), method 300 proceeds to 316 as the controller 46 detects that the timer has expired. The expiration of the timer may be detected by the controller 46 once the timer reaches a target value. In some examples, the target value of the timer corresponds with an expected length of time for the food product 9 to travel the full length of the cooking conveyor 3. It will be recognized that this may be determined for a conveyor speed and thus the expected time at 316 may be calculated or otherwise determined by the controller based upon a set or detected conveyor speed. In some examples, the target timer value includes the travel time of the cooking conveyor 3 plus a buffer time. For example, the buffer time may account for the time the finished food product 9 must travel along the discharge ramp 4 before being deposited in a food storage container.

Upon expiration of the timer, the controller 46 proceeds to signal the end of the cook cycle at 318. In an exemplary embodiment, signaling the end of the cook cycle comprises transmitting a signal to operate the indicator device 14. In various examples, the indicator device 14 may provide a visual or audible notification of the completion of the cook cycle. For example, an indicator light mounted on the broiler may illuminate, or an indicator speaker may emit a beeping noise. In still further examples, the controller 46 may transmit the signal indicating the end of the cook cycle to the KMS 48. Upon receipt of the signal, the KMS 48 may operate additional kitchen equipment to store or serve the finished food product 9.

Returning to the example from above, if the KMS 48 transmits a signal to the controller 46 to prepare 30 hamburger patties, the controller 46 operates the loading assembly 42 to deposit 30 patties in succession onto the loading conveyor 3. The controller 46 operates the loading conveyor 8 to move each patty into the field of view of the inlet sensor 44 positioned above the food product inlet 12. The presence of each new patty in the field of view of the inlet sensor 44 prompts the controller 46 to reset a cook cycle timer. The controller 46 operates the heat sources 2 and the cooking conveyor 3 to cook each patty. After the 30th patty has passed out of the field of view of the inlet sensor 44, the cook cycle timer runs until the target value has expired and the 30th patty has been deposited into a storage area by the discharge ramp 4. At this time, the controller 46 sends a signal to the indicator device 14 to alert a user that all 30 hamburger patties have been prepared. Advantageously, the systems and method described herein significantly reduce the need for a user to actively monitor the broiler 100. Because the user is notified of the end of the cook cycle by the indicator device 14, the user can promptly attend to the finished food product, and ensure it is stored or served in a manner that prevents degradation of the food product in temperature or quality.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A heat transfer system for cooking a food product comprising:
    an enclosure comprising a food product inlet, a food product outlet, and a plurality of walls;
    at least one conveyor extending into the enclosure from the food product inlet;
    a plurality of heat sources arranged about the at least one conveyor, the plurality of heat sources operate to output heat towards the at least one conveyor;
    a discharge ramp extending below the at least one conveyor; and
    a warming assembly positioned within the enclosure below the at least one conveyor, the warming assembly defining a controlled environment, the warming assembly defining a vertical extent of the food product outlet to less than or equal to a vertical extent of the controlled environment the warming assembly configured to removably receive at least one pan through the food product outlet into the controlled environment at a position below the discharge ramp, the at least one pan configured to receive cooked food product off of the discharge ramp and store cooked food product, wherein the pan and cooked food product are removable from the warming assembly through the food product outlet;
    wherein the at least one conveyor is a first conveyor of a plurality of conveyors also comprising a second conveyor, the discharge ramp is a first discharge ramp of a plurality of discharge ramps also comprising a second discharge ramp, and the at least one pan is a first pan of a plurality of pans also comprising a second pan.

2. The heat transfer system of claim 1, further comprising a lower electric heating element positioned within the warming assembly below the opening, wherein the lower electric heating element is configured to output heat into the controlled environment of the warming assembly.

3. The heat transfer system of claim 1, further comprising an upper electric heating element positioned within the warming assembly below the plurality of heat sources and above the opening, wherein the upper electric heating element is configured to output heat for a warming process of the warming assembly.

4. The heat transfer system of claim 1, wherein the warming assembly is configured to receive the first pan in a position within the controlled environment vertically below the first conveyor and a portion of the first pan vertically below the first discharge ramp to receive cooked food product off of the first conveyor and first discharge ramp, and the warming assembly is configured to receive the second pan in a position within the controlled environment vertically below the second conveyor and a portion of the second pan vertically below the second discharge ramp to receive cooked food product off of the second conveyor and second discharge ramp.

5. The heat transfer system of claim 4, further comprising a first shield located within the warming assembly between the first conveyor and the pan, the first shield angled towards the first discharge ramp to collect liquid dripping through the first conveyor and direct the liquid onto the first discharge ramp, and a second shield located within the warming assembly between the first conveyor and the pan, the second shield angled towards the second discharge ramp to collect liquid dripping through the second conveyor and direct the liquid onto the second discharge ramp.

6. The heat transfer system of claim 5, further comprising at least one lid removably positioned within the warming assembly at a location between the at least one pan and the at least one conveyor, wherein the at least one lid is configured to maintain the controlled environment about the at least one pan.

7. The heat transfer system of claim 6, wherein the at least one lid extends over a partial length of the at least one pan between ½ and ¾ of the length of the pan from the opening.

8. The heat transfer system of claim 1, wherein at least one heat source of the plurality of heat sources arranged about the at least one conveyor is configured to provide heat energy to the warming assembly.

9. The heat transfer system of claim 8, wherein the plurality of heat sources comprises at least one lower heat source positioned below the at least one conveyor and heat energy is directed from the at least one lower heat source into the warming assembly to heat the controlled environment.

10. The heat transfer system of claim 9, wherein the warming assembly is configured to hold the at least one pan in a position aligned below the at least one conveyor.

11. The heat transfer system of claim 10, wherein the at least one pan is configured to collect juice dripping from the cooked food product through the at least one conveyor.

12. The heat transfer system of claim 1, further comprising a front shield movably secured to the enclosure, whereby the front shield is movable between a closed position wherein front shield defines the vertical extent of the food product outlet to less than or equal to the vertical extent of the controlled environment and an open position vertically opening the food product outlet for movement of the at least one pan through the food product outlet.

13. The heat transfer system of claim 1, wherein the warming assembly is detachably coupled to the enclosure.

14. The heat transfer system of claim 1, further comprising a front shield comprising a first portion that defines the vertical extent of the food product outlet to less than or equal to the vertical extent of the controlled environment and comprises a second portion extending interior to the warming assembly from the first portion and defining the controlled environment about the at least one pan.

15. The heat transfer system of claim 4, further comprising:
a pan drawer movably retractable within the controlled environment, the pan drawer comprising a first aperture configured to receive the first pan and a second aperture configured to receive the second pan;
wherein the pan drawer is configured to position the first pan vertically below the first conveyor and the portion of the first pan vertically below the first discharge ramp and configured to position the second pan vertically below the second conveyor and the portion of the second pan vertically below the second discharge ramp.

16. The heat transfer system of claim 1, wherein the warming assembly further comprises at least one indicator device that operates to indicate a status of one of at least one pan.

17. A heat transfer system for cooking a food product comprising:
an enclosure comprising a food product inlet, a food product outlet, and a plurality of walls;
at least one conveyor extending into the enclosure from the food product inlet;
a plurality of heat sources arranged about the at least one conveyor, the plurality of heat sources operate to output heat towards the at least one conveyor;
a discharge ramp extending below the at least one conveyor;
a warming assembly positioned within the enclosure below the at least one conveyor, the warming assembly defining a controlled environment, the warming assembly defining a vertical extent of the food product outlet to less than or equal to a vertical extent of the controlled environment, the warming assembly configured to removably receive at least one pan through the food product outlet into the controlled environment at a position below the discharge ramp, the at least one pan configured to receive cooked food product off of the discharge ramp and store cooked food product, wherein the pan and cooked food product are removable from the warming assembly through the food product outlet, the warming assembly comprising at least one indicator device that operates to indicate a status of the at least one pan; and
a controller, the controller configured to receive a signal detecting a food product proximate the food product inlet, start a cook cycle time based upon receipt of the signal and operate the at least one indicator to indicate an ongoing cook cycle, upon expiration of a cook cycle time, operate the indicator to indicate completion of the cook cycle, upon expiration of a set amount of time from the completion of the cook cycle operate the at least one indicator to indicate an excessive hold time.

18. The heat transfer system of claim 17, further comprising:
a loading assembly and a loading conveyor arranged proximate the food product inlet, wherein food products stored in the loading assembly are individually moved to the food product inlet by operation of the loading conveyor; and
an inlet sensor arranged proximate the food product inlet, wherein the inlet sensor comprises at least one of a photosensor, a camera, a laser time-of-flight sensor, an ultrasonic sensor, or a temperature sensor, and wherein the sensor produces the signal detecting the food product proximate the food product inlet.

19. A heat transfer system for cooking a food product comprising:

an enclosure comprising a food product inlet, a food product outlet, and a plurality of walls;

at least one conveyor extending into the enclosure from the food product inlet;

a plurality of heat sources arranged about the at least one conveyor, the plurality of heat sources operate to output heat towards the at least one conveyor;

a discharge ramp extending below the at least one conveyor;

a warming assembly positioned within the enclosure below the at least one conveyor, the warming assembly defining a controlled environment, the warming defining a vertical extent of the food product outlet to less than or equal to a vertical extent of the controlled environment the warming assembly configured to removably receive at least one pan through the food product outlet into the controlled environment at a position below the discharge ramp, the at least one pan configured to receive cooked food product off of the discharge ramp and store cooked food product, wherein the pan and cooked food product are removable from the warming assembly through the food product outlet; and an upper electric heating element positioned within the warming assembly below the plurality of heat sources and above the opening, wherein the upper electric heating element is configured to output heat for a warming process of the warming assembly.

20. The heat transfer system of claim 19, further comprising a lower electric heating element positioned within the warming assembly below the opening, wherein the lower electric heating element is configured to output heat into the controlled environment of the warming assembly.

21. The heat transfer system of claim 19, wherein the at least one upper electric heating element is spaced apart from the discharge ramp.

* * * * *